United States Patent
Reinecke et al.

(10) Patent No.: US 7,429,237 B2
(45) Date of Patent: Sep. 30, 2008

(54) PACKAGING FOR A STORAGE MEDIUM, IN PARTICULAR FOR A CD

(75) Inventors: Frank Reinecke, Chodowieckistr. 29, Berlin (DE) 10405; Thorsten Irgang, Gerstenackerweg 36, Berlin (DE) 14080; Timur Walter, Berlin (DE)

(73) Assignees: Frank Reinecke, Berlin (DE); Thorsten Irgang, Berlin (DE)

( * ) Notice: Subject to any disclaimer, the term of this patent is extended or adjusted under 35 U.S.C. 154(b) by 66 days.

(21) Appl. No.: 11/467,766

(22) Filed: Aug. 28, 2006

(65) Prior Publication Data

US 2006/0283147 A1 Dec. 21, 2006

Related U.S. Application Data

(62) Division of application No. 10/451,572, filed as application No. PCT/EP01/15272 on Dec. 21, 2001, now Pat. No. 7,108,649.

(30) Foreign Application Priority Data

Dec. 21, 2000 (DE) .............................. 200 21 924 U

(51) Int. Cl.
*B31B 49/02* (2006.01)
(52) U.S. Cl. .................... 493/143; 493/145; 493/58; 72/466.8; 72/445
(58) Field of Classification Search ................. 493/143, 493/145, 58; 72/466.8, 445
See application file for complete search history.

(56) References Cited

U.S. PATENT DOCUMENTS

| | | | |
|---|---|---|---|
| 2,262,765 A | 11/1941 | Iig | |
| 2,288,860 A | 7/1942 | Wallace et al. | |
| 3,212,206 A | 10/1965 | Langan et al. | |
| 3,323,983 A | 6/1967 | Palmer et al. | |
| 3,799,040 A | 3/1974 | Fox et al. | |
| 4,146,976 A | 4/1979 | Zambiasi | |
| 4,867,057 A | 9/1989 | Bradley et al. | |
| 5,036,758 A | 8/1991 | Kobayashi et al. | |
| 5,065,610 A * | 11/1991 | Yonezawa | 72/462 |
| 5,226,306 A * | 7/1993 | Yoshino et al. | 72/313 |
| 5,347,888 A * | 9/1994 | Yoshino et al. | 76/107.1 |
| 5,412,972 A | 5/1995 | Congelliere | |
| 5,775,492 A | 7/1998 | Ban | |
| 6,126,201 A | 10/2000 | Pace et al. | |
| 6,241,417 B1 | 6/2001 | Schlutius | |
| 6,349,639 B1 | 2/2002 | Smith et al. | |
| 6,681,826 B1 | 1/2004 | Biagiotti | |
| 2002/0139699 A1 | 10/2002 | Hansen et al. | |

FOREIGN PATENT DOCUMENTS

DE 296 14 442 1/1997

(Continued)

*Primary Examiner*—Hemant M Desai
(74) *Attorney, Agent, or Firm*—Baker & Daniels LLP

(57) ABSTRACT

A method for the production of a packaging for a CD-like storage medium, by means of a lower die, with a recess and an upper die with a working stamp corresponding to the recess. A card of deep-drawable material is placed between the upper and lower die and an elastic body is placed between the card and the lower die or between the card and the upper die.

1 Claim, 4 Drawing Sheets

FOREIGN PATENT DOCUMENTS

| | | |
|---|---|---|
| DE | 196 46 397 | 9/1997 |
| DE | 199 09 475 | 9/2000 |
| FR | 1.224.080 | 6/1960 |
| FR | 2 762 423 | 10/1998 |
| GB | 2 331 981 | 6/1999 |
| GB | 2 349 359 | 11/2000 |

* cited by examiner

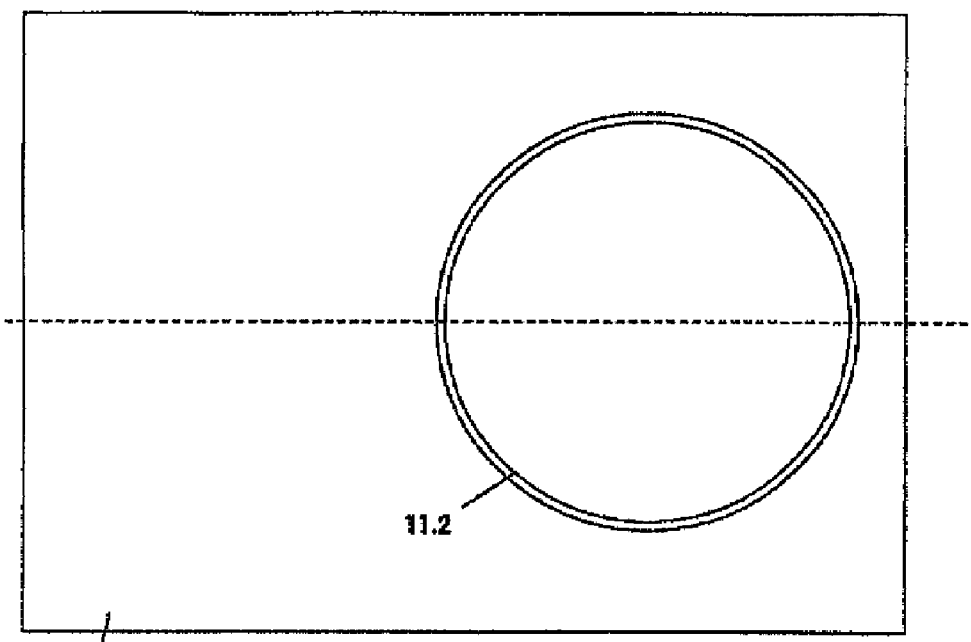
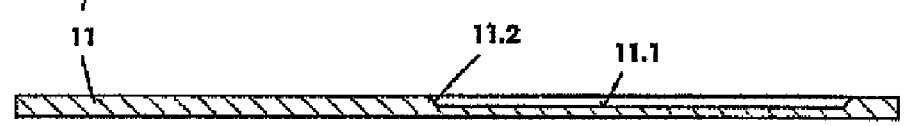
Fig. 8
Fig. 9
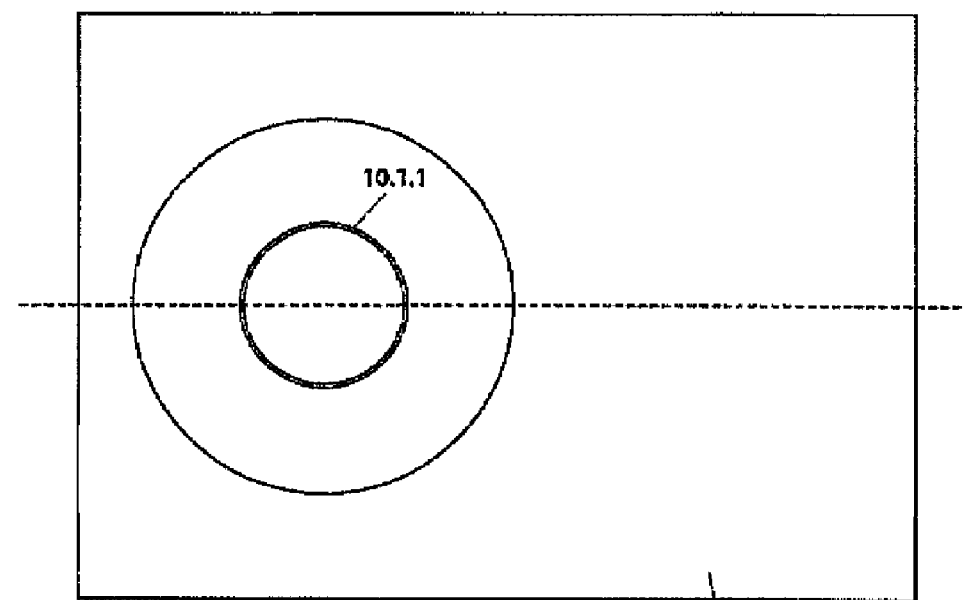
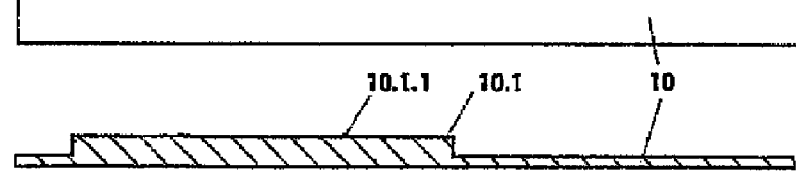
Fig. 10
Fig. 11

PACKAGING FOR A STORAGE MEDIUM, IN PARTICULAR FOR A CD

This application is Division of U.S. application Ser. No. 10/451,572 published on Apr. 20, 2004, now U.S. Pat. No. 7,108,649, issued on Sep. 19, 2006.

BACKGROUND

The invention relates to a packaging for a multimedia storage medium like a mini CD, a CD, a SupremeCARD, cut CD, a DVD, memory chips and other mass storage media (further called storage medium).

Such packaging is well known. As basis a card made from a fiber containing material is used, for example made from paper or cardboard. It is well known, to provide such cards with a bulge, whose shape corresponds to the storage medium to be contained. Reference is made to the following publications:

(1) GB 23 49 359 A

This publication shows a card with an impression for containing a storage medium. The localization of the data storage medium (CD) takes place by means of a circular adhesive area 8. Instead of the adhesive film sector-patterned flaps 13 are intended.

(2) WO 00 66 368 A1

The packaging described here exhibits only in outlines an impression of undetermined depth. A securing against falling out of the storage medium is also missing here.

(3) FR 27 72 350 A1

This publication shows a card, which carries a storage medium in a way not specified in more detail.

(4) WO 00 56 555 A1

The same applies here, as with publication (3).

(5) DE 297 11 577 U1

The packaging represented here serves the purpose of containing a storage medium, while nothing is stated about the localization of the storage medium at the card.

(6) DE 296 19 409 U1

The same applies here as concerning publication (5).

(7) DE 29612 920 U1

The same applies here as concerning the packaging according to publication (5).

(8) DE 196 46 397 A1

Concerning this packaging the same applies as concerning the packaging according to publication (5).

(9) U.S. Pat. No. 5,775,492 A1

The recess for containing a CD or similar is not created by impression, but by punching from a sheet ("inner sheet 8").

(10) U.S. Pat. No. 3,799,040 describes a procedure for imprinting a CD packaging made from paper or cardboard. Hereby an elastic body is used, in order to obtain a better imprint.

The well-known packagings have disadvantages depending upon design and method of manufacturing. These are for example high manufacturing costs, an unsatisfactory durability, or a lack of aesthetics.

SUMMARY OF THE INVENTION

It is the task of the invention to provide a procedure and a device for manufacturing such a card that does not exhibit these shortcomings and accordingly also such a card itself The invention relates to a procedure for manufacturing a packaging for a CD-shaped storage medium by means of a lower die which includes a recess as well as an upper die which includes a work stamp corresponding to the recess. A card made from a material that can be deep-drawn is placed between the lower die and the upper die and an elastic annular body is placed between the card and the lower die and/or between the card and the upper die. Between the outside diameter of the work stamp and the inside diameter of the annular body there exists a gap.

The card according to the invention exhibits the following benefits: It can be made of environmental acceptable material, especially material saving and economically. The packaging according to the invention is environment-friendly, as the materials can be reused in a simple manner.

The production is energy saving. The storage medium is protected reliably from damages by external effects. The packaging is economical, because it can be manufactured mechanically. It can easily be used as advertising media.

With the new procedure it is possible to imprint various cardboard materials, which are used for example for regular postcards, twice as deep as before, without causing tearing or wrinkling. Thus new applications for the imprinted cardboard become possible. Among these applications is the packaging range, in which now flat media can be packed very material saving and therefore environmental friendly, whereby the medium can occlude with the cardboard top side and can be closed/localized by a simple, flat attachment at the top sides/opening.

In addition to saving material in favor of the environment there is the decrease of the packaging weight, which leads particularly during shipping and distribution to lower costs Through the possibility of the flat occlusion with the cardboard top side a flat medium as for example a mini CD can be shipped with the cardboard packaging as approved postcard of the German Postal AG and is even suitable for automated address reading and sorting of the shipment. In case of localization with a transparent foil the medium is visible completely and directly from the top side, thus this packaging additionally stands out against the present available shipping packaging for such media, like mini CDs. It was not possible to make impressions of a larger depth with the well-known procedures. If a certain dimension of the impression depth was exceeded, then concentric folds were created or the material tore. The upper die draws material into the recess, before the material is sufficiently localized by the contact pressure of the mold. This does not happen with the invention.

The length of the work stamp of the upper die is larger than the depth of the imprint recess. This additional dimension results from the thickness of the absorption body, for example a ring made of sponge rubber.

The thickness of this ring made of sponge rubber depends for its part on the compression behavior of the rubber. The thickness of the ring made of sponge rubber at maximum compression plus the depth of the lower die results in the length of the work stamp of the upper die. Thereby the sponge rubber without pressure should have for instance the length of the stamp of the upper die. In a design example the sponge rubber section had a thickness of 4 mm. The work stamp of the upper die had likewise a length of 4 mm. This led to very good results. These dimensions proved to be favorable for the machine handling. Therefore getting stuck when inserting is avoided.

Besides the thickness of the sponge rubber also the inside and outside diameters as well as the arrangement of the rubber ring are of importance.

The inside diameter must allow enough distance to the upper die so that the narrowing of the diameter of the rubber during compression does not lead to the fact that the rubber is caught between the upper die flank and the lower die recess. The impressed object tears in this case. Therefore on the one hand the distance to the upper die is necessary, on the other hand the upper die should not be conical (according to the lower die image), since otherwise the widening rubber could be pushed up. The outside diameter should be selected in such a manner that the ring exhibits a concentric width of at least approx. 9 mm. With smaller width (for example 5 mm) the supporting surface is not sufficient in order to localize the object to be imprinted; pulling wrinkles occur.

During the arrangement of the rubber attention should be paid that an even supporting surface exists in the compression area of the upper die and an even lower die surface within the entire supporting area of the rubber, at least however in the entire useful range of the supporting surface of the rubber. Therefore the rubber should be arranged as close as possible to the imprint stamp, so that no stretching of the object to be imprinted can occur between the imprinting position and the beginning of the sponge rubber. Such a stretching could in particular cause waviness and re-shaping of the imprint.

A holding-down device with absorbing coating is also possible. Attention to the dimensioning of the absorption coating has to be paid only to that extent that no impression or other traces remain on the object to be imprinted within the area of the useful range. The arrangement can be selected corresponding to the sponge rubber. The length of the imprint stamp is thereby insignificant since it here may not be integrated in a plate, but should be able to be moved independently of the holding-down device. With this procedure a reversal of the upper die—lower die position is offered. That is, the lower die lies underneath and the stamp of the upper die is imprinted from above.

The heating up of the lower die and the extension of the exposure time for the influence of the forces and warmth considerably reduce the back deformation of the imprint.

BRIEF DESCRIPTION OF THE DRAWINGS

The invention is described in more detail with the drawings:

FIG. 8 shows a lower die in top view.

FIG. 9 shows the lower die according to FIG. 8 in a sectional view.

FIG. 10 shows the corresponding upper die in top view.

FIG. 11 shows the upper die according to FIG. 10 in a sectional view.

DETAILED DESCRIPTION

Figure 1:
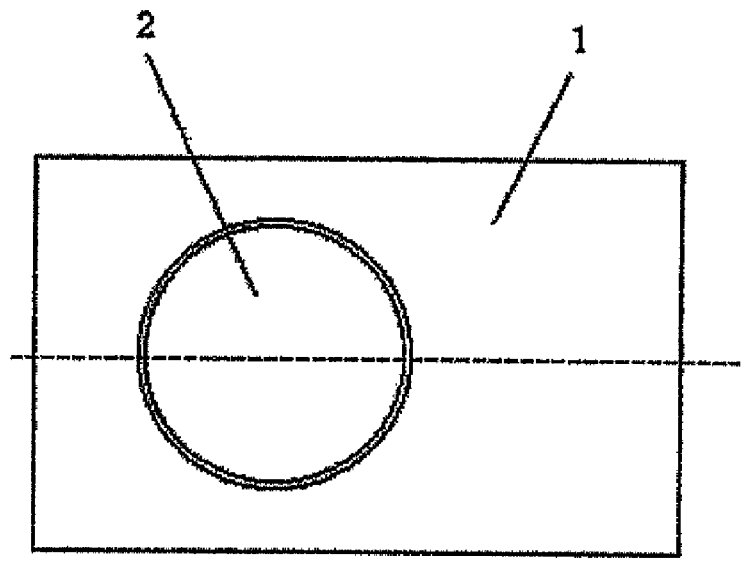
FIG. 1 shows a card according to the invention with an imprint as a component of a packaging according to the invention.
Figure 2:
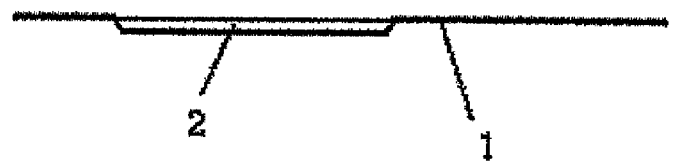
FIG. 2 is a sectional view through the card of FIG. 1.
Figure 3:
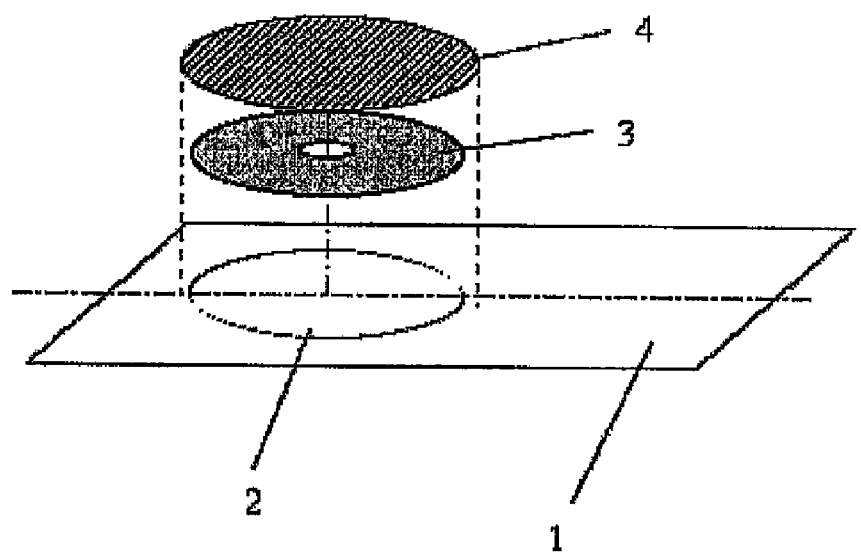
FIG. 3 shows in exploded view the card, the storage medium to be contained as well as a cover foil, according to a first design variation.

In FIGS. 1 to 3 a card 1 can be recognized. This card can have postcard format or can be larger or smaller. The card consists in the present case of cardboard. The cardboard concerns a cardboard quality with a gsm substance of 100 g/m$^2$. Also gsm substances up to 500 g/m$^2$, for example 150, 200, 250 g/m$^2$ are possible. Different materials are also conceivable, for example a non-woven cloth made from cellulose or from synthetic materials.

The card 1 exhibits a deep-drawn imprint 2. The imprint is circular and has an even depth when viewed in top view. It serves the purpose of containing of a storage medium 3. This storage medium is in the present case a CD.

As can be seen in FIG. 2, a raised part emerges on the back of the card 1—according to the mentioned imprint 2. The motif side of the card 1 is the surface visible in FIGS. 1 and 3. This surface can carry inscriptions If the storage medium 3 is inserted into the imprint 2, then it can be covered with the foil 4. The foil 4 is a self-adhesive foil. It can be easily pulled off. It needs to exhibit an adhesive coating only at its circumferential area, in order to cause an adhesive bond to the card. The majority of the lower surface of the foil 4 in FIG. 3 is thus free of adhesive coating.

Figure 4:
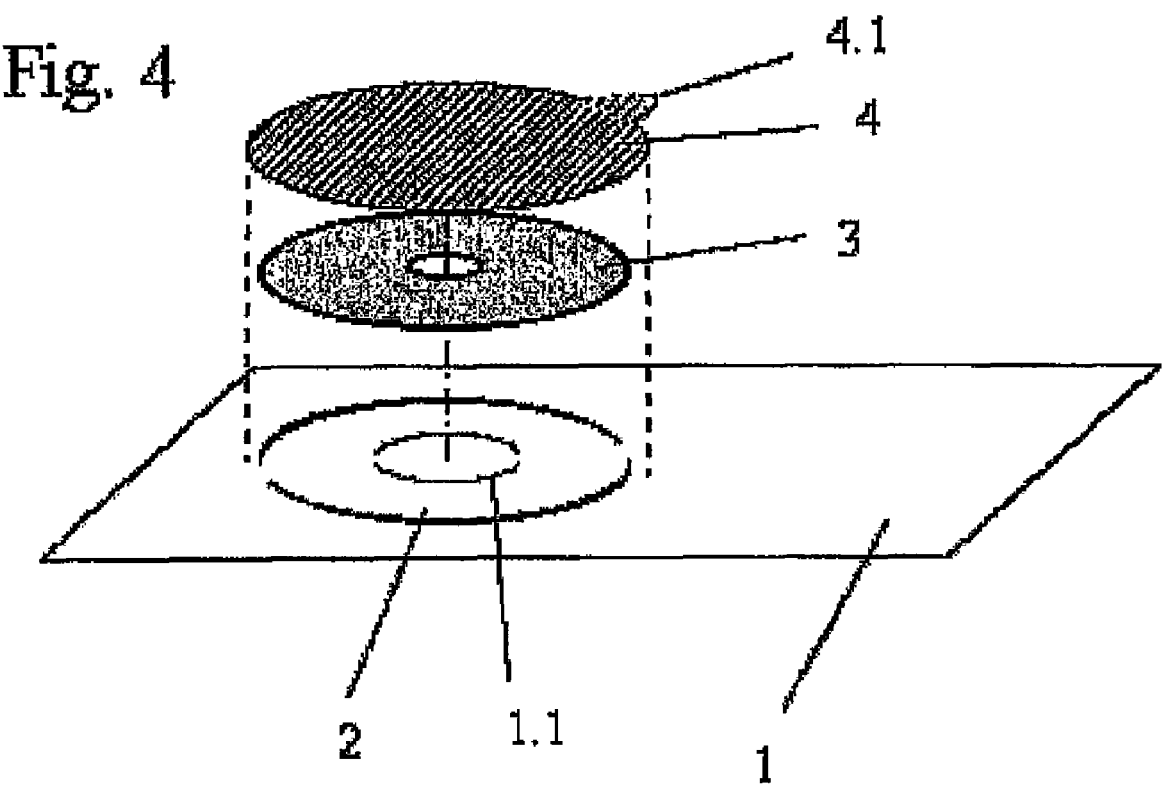
FIG. 4 shows in a representation similar to the one according to FIG. 3 a second design variation.

The imprint 2 does not need to have the shape of the storage medium 3, but can be varied at will as design might dictate (for example a round CD in a star shaped imprint). The card 1 including the storage medium 3 can be printed with arbitrary motifs The design variation shown in FIG. 4 differs in two points according to the one from FIG. 3:

The foil 4 exhibits a strap 4.1 for easier removal. The foil 4 can be adhesive on the entire surface. This applies also to the foil according to FIG. 3. A further characteristic exists in the following:

Through an appropriate design of the work stamp of the upper die—see further below—the card 1 is circularly condensed—see groove 1.1—, without this appearing on the card 1. The groove has a depth of 0.1 to 0.2 mm. Its diameter corresponds to the diameter of the stacking ring, which is provided with a CD. The dimensions change from product to product.

Figure 5:
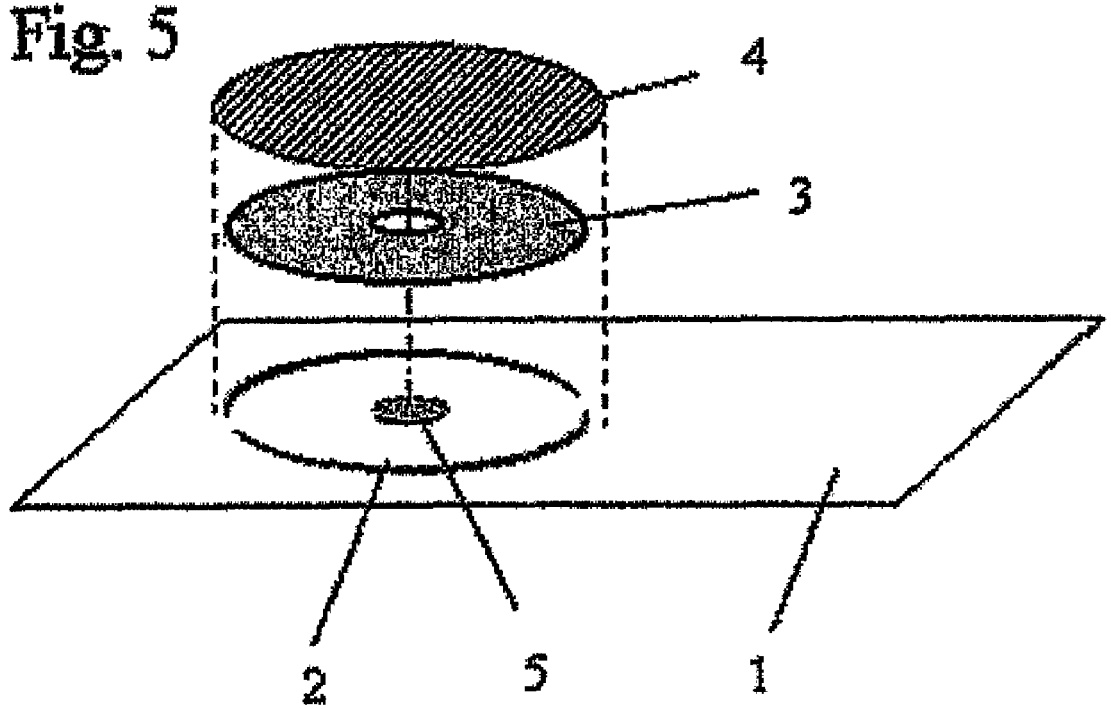
FIG. 5 shows in a representation similar to the one according to FIG. 3 a sixth design variation.

The design variation according to FIG. 5 varies only concerning one characteristic from the one according to FIG. 3. Here a detention pad 5 is glued on the bottom of the imprint 2. In the present case this pad is circular. Its shape could also deviate from this. It consists for example of foamed material, for example of PP foam. It is glued on after manufacturing the card 1 with its imprint 2. The CD is attached to the detention pad 5 and stays connected to it by frictional engagement, i.e. both surfaces exhibit a layer of adhesive, so that it can be localized on the one hand at the bottom of the imprint 2 and on the other hand at that CD, in order to hold the CD in the imprint 2.

Figure 6:
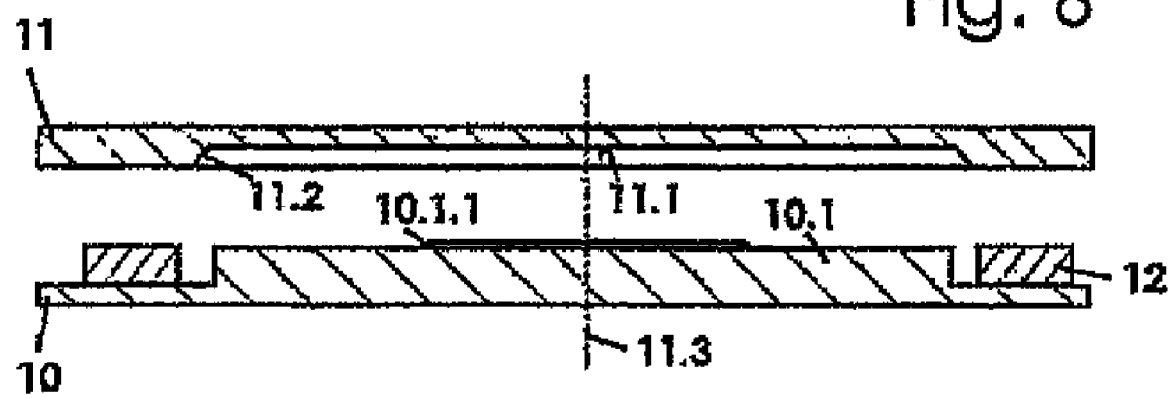
FIG. 6 shows a stamping die with lower die and upper die in a profile section.
Figure 7:
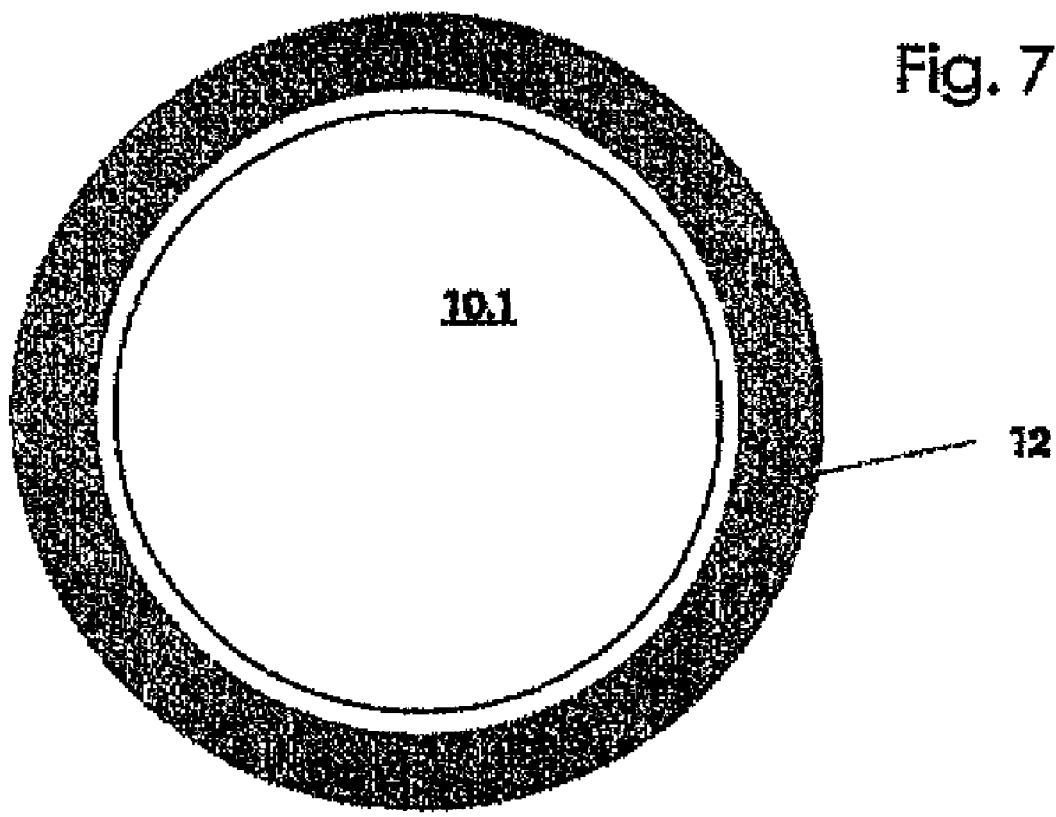
FIG. 7 shows the upper die according to FIG. 4 in top view.

FIGS. 6 and 7 show the design of a stamping die. In FIG. 6 an upper die 10 and a lower die 11 can be recognized. The upper die 10 exhibits a work stamp 10.1. The lower die 11 exhibits a recess, which serves as mold cavity. The recess exhibits a bottom 11.1 and a circular limitation surface 11.2. The circular limitation surface is tilted against the longitudinal axis 11.3 of the tool. The longitudinal axis 11.3 is at the same time the axis, on which the two tool parts 10, 11 move relatively to each other, in order to conduct the imprinting work.

The work stamp 10.1 of the upper die 10 is not tilted. As one recognizes from FIG. 7, it is circular. Its outside diameter corresponds to the diameter of the bottom area 11.1 of the recess in the lower die.

As one recognizes furthermore from FIGS. 6 and 7, the upper die 10 exhibits a ring 12 made from sponge rubber. Between the outside diameter of the work stamp 10.1 and the inside diameter of the ring made of sponge rubber 12 exists a gap. The ring made of sponge rubber 12 therefore does not rest touchingly against the outside, cylindrical circumferential surface of the work stamp 10.1.

The thickness of the ring made of sponge rubber 12 is approximately equal the length of the work stamp 10.1 measured in direction of the axis 11.3.

In the present case the work stamp 10.1 is cylindrical. The edge at its free end can be slightly radiused. The work stamp 10.1 can however likewise be of a truncated shape, so that it is geometrically similar to the recess of the lower die 11.

The card 1 can on both sides already be printed on before the imprint. The imprint does not damage the motif. This is a benefit of the invention.

In FIGS. 8 to 11 there is shown again a stamping die, comprising an upper die 10 and a lower die 11. The dimensions used in practical operation are indicated. FIGS. 10 and 11 are here of special interest. Here one recognizes an annular rib 10.1.1. This rib is molded to the front surface of the work stamp 10.1. The rib could also be applied as separate ring on the front surface of the work stamp 10.1 and be firmly connected with it.

The invention claimed is:

1. A method for manufacturing a package for a CD-shaped storage medium, comprising:
    providing a rigid lower die including a recess and providing a rigid upper die including a working stamp having a thickness;
    providing an elastic annular body having a thickness substantially equal to the thickness of the working stamp and an inner diameter greater than the outer diameter of the working stamp;
    positioning the annular body such that an annular gap is present between the outer diameter of the working stamp and the inner diameter of the annular body;
    placing between the upper and lower dies a card made of a material that can be deep-drawn; and
    moving the upper and lower dies together to compress the elastic annular body and imprint the card.

\* \* \* \* \*